United States Patent
Chouf et al.

(10) Patent No.: US 8,378,253 B2
(45) Date of Patent: Feb. 19, 2013

(54) METHOD FOR LASER WELDING USING A NOZZLE CAPABLE OF STABILIZING THE KEYHOLE

(75) Inventors: Karim Chouf, Montmorency (FR); Philippe Lefebvre, Meulan (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 292 days.

(21) Appl. No.: 12/812,145

(22) PCT Filed: Dec. 16, 2008

(86) PCT No.: PCT/FR2008/052318
§ 371 (c)(1),
(2), (4) Date: Jul. 8, 2010

(87) PCT Pub. No.: WO2009/087325
PCT Pub. Date: Jul. 16, 2009

(65) Prior Publication Data
US 2010/0282723 A1 Nov. 11, 2010

(30) Foreign Application Priority Data
Jan. 8, 2008 (FR) ...................................... 08 50074

(51) Int. Cl.
*B23K 26/02* (2006.01)
(52) U.S. Cl. .......... 219/121.63; 219/121.64; 219/121.78
(58) Field of Classification Search ............. 219/121.64, 219/121.63, 121.84, 121.78, 121.85
See application file for complete search history.

(56) References Cited

U.S. PATENT DOCUMENTS

| 5,148,446 | A | 9/1992 | Radich et al. |
| 5,496,985 | A | 3/1996 | Foltz et al. |
| 2006/0065650 | A1* | 3/2006 | Guo .......................... 219/121.84 |
| 2007/0119837 | A1 | 5/2007 | Nishiya et al. |
| 2007/0210040 | A1 | 9/2007 | Sakamoto et al. |
| 2009/0134132 | A1* | 5/2009 | Verna et al. ............... 219/121.64 |

FOREIGN PATENT DOCUMENTS

| EP | 1 018 395 | 7/2000 |
| JP | 2003 181676 | 7/2003 |

OTHER PUBLICATIONS

PCT/FR2008/052318 Written Opinion dated Jul. 13, 2009.
FR 0850074 French Search Report dated Aug. 5, 2008.
PCT/FR2008/052318 International Search Report, mailed Jul. 13, 2009.

* cited by examiner

*Primary Examiner* — Minh-Loan T Tran
(74) *Attorney, Agent, or Firm* — Elwood L. Haynes

(57) ABSTRACT

The invention relates to a method for welding with a laser beam, using a welding nozzle comprising: a nozzle body having an axis and including at least an upper surface, a lower surface and a peripheral wall; an axial cavity extending between the upper and lower surfaces of the nozzle body so as to define an outer channel recessed from the surface of said peripheral wall; and a plurality of inner passages drilled through the nozzle body between the upper and lower surfaces. The laser welding method of the invention provides a dynamic gas jet mechanically interacting with the molten metal bath, and further enables better control of the bath hydrodynamic flows, and thus better laser-welding efficiency.

13 Claims, 3 Drawing Sheets

METHOD FOR LASER WELDING USING A NOZZLE CAPABLE OF STABILIZING THE KEYHOLE

CROSS-REFERENCE TO RELATED APPLICATIONS

This application is a §371 of International PCT Application PCT/FR2008/052318, filed Dec. 16, 2008.

BACKGROUND

1. Field of the Invention

The invention relates to a laser welding process using a nozzle designed, adapted and formed so as to be used in laser beam welding, more simply called a "laser nozzle", which has a particular form enabling the hydrodynamics of the liquid metal pool to be better controlled when said nozzle is employed in a laser beam welding process, through which on the one hand a laser beam and on the other hand a gas pass.

2. Related Art

Laser beam welding is a well known process that is widely used industrially for assembling various materials, such as carbon steel, stainless steels, aluminum and light alloys etc.

Schematically, in order to implement a laser welding process, a laser source or generator is used for generating a laser beam that is conveyed via an optical fiber or via other optical means such as mirrors, lenses, etc. to one or more parts to be welded. The energy of the beam makes it possible to melt the constituent parts and in this way to obtain, after cooling, a weld bead between the parts to be welded.

In order to prevent contamination of the weld bead by atmospheric impurities, a shielding gas is normally used for protecting the welding zone. The type of shielding gas chosen depends in particular on the nature of the material constituting the parts to be welded, but gases such as helium, argon, nitrogen, $CO_2$, oxygen, hydrogen (to a certain extent) and mixtures thereof are conventionally used.

In order to deliver the shielding gas and the laser beam, a nozzle commonly called a "laser nozzle" is normally used.

Laser nozzles used on laser welding machines conventionally have a cylindrical, conical or tapered shape and are drilled in their center with a central passage through which the laser beam passes and into which the shielding gas is introduced so as to be distributed above the welding zone coaxially to the laser beam.

This type of nozzle enables the shielding gas to be distributed in the vicinity of the zone of interaction between the laser beam and the material to be welded and to inert it. Inerting this zone makes coupling between the laser beam and the material effective, while protecting the molten metal pool from atmospheric contamination.

However, gas flows are usually laminar and slow. In point of fact, the gas jet distributed by this type of nozzle does not exert a dynamic force on the molten metal pool and does not affect the hydrodynamic flows of the molten metal pool forming during welding.

These types of slow flow lead to satisfactory welding results under standard conditions of use. However, with these types of flow, many welding configurations exist where laser welding is impossible, for example welding of stacks of several metal sheets coated with zinc or the like with zero play between them.

SUMMARY OF THE INVENTION

The object of the invention is to provide an improved welding process employing a specific welding nozzle, that is to say capable of, and designed to generate a dynamic gas jet which, during the actual laser welding, interacts mechanically with the molten metal pool, and in addition allows better control of the hydrodynamic flows of the pool and therefore the efficiency of the laser beam welding process.

The object of the invention is also to provide a laser welding process making it possible to obtain, according to the case, better penetration and/or better welding quality than a conventional process, in particular better metallurgical quality, and/or making it possible to obtain better evacuation of the metal vapor emitted during welding, in particular zinc vapor during welding of coated metal sheets, and/or enabling welding configurations to be welded that are reputed to be difficult, such as stacks of metal sheets, or even increasing welding rates when welding some assemblies.

The solution of the invention is a laser beam welding process employing a laser beam welding nozzle formed from a nozzle body of axis (X-X) comprising at least an upper surface, a lower surface and a peripheral wall, characterized in that a nozzle is employed comprising:

- an axial cut-out extending between the upper and lower surfaces of the nozzle body, provided in the peripheral wall of the nozzle body, so as to form an external channel set back relative to the surface of said peripheral wall, and
- several internal passages drilled through the nozzle body between the upper and lower surfaces.

In point of fact, using such a laser welding nozzle makes it possible to generate a dynamic gas jet capable of interacting mechanically with the welding capillary and the molten metal pool so as to push back the rear wall of the capillary that supports the molten pool, to widen the mouth of the capillary and to modify the hydrodynamic flows of the pool. In fact, the gas jet delivered through the laser nozzle causes the mouth of the capillary to open by at least twice the diameter of the laser beam over a depth of at least one times the diameter of the beam.

Depending on the case, the process of the invention may comprise one or more of the following features:

- the nozzle body has a semi-frustoconical general shape and the peripheral wall of said nozzle body comprises a flat peripheral surface within which the axial cut-out forming the external channel is provided;
- the nozzle has 2 to 10 internal passages, preferably 3 to 5 internal pass;
- the axial channel of the nozzle are drilled equidistant from the axial channel;
- the internal passages of the nozzle are drilled equidistant from the axial channel;
- the diameter of the internal passages lies between 0.5 mm and 5 mm, preferably between 1.5 mm and 2.5mm;
- the internal passages of the nozzle are oriented toward the axis (X-X) of the nozzle;
- the slope of the internal passages of the nozzle lies between 10° and 80° relative to the horizontal plane, preferably between 30° and 60°, and even more preferably between 40° and 50°;
- the length of the internal passages of the nozzle lies between 5 mm and 200 mm, preferably between 20 and 100 mm, even more preferably between 30 and 50 mm, the length of the internal passages being the distance traversed by each internal passage between the upper surface and lower surface of the nozzle body;
- the upper surface of the nozzle body has a fixing device for fixing the nozzle to a support, in particular to a laser machine;
- the nozzle is fixed to a laser beam welding machine;

a laser beam is made to pass through the axial channel of the nozzle and a gas or gas mixture is made to pass through the internal passages of the nozzle;

a gas chosen from helium, argon, nitrogen, carbon dioxide, oxygen, purified air and mixtures of these gases is used;

a stack of several metal sheets is welded;

several coated metal sheets are welded;

several zinc coated metal sheets are welded;

the laser beam is generated by a laser beam generator of the $CO_2$ laser, Nd:YAG laser, diode laser or ytterbium-doped or fiber laser type.

DETAILED DESCRIPTION OF THE INVENTION

Figure 1A:
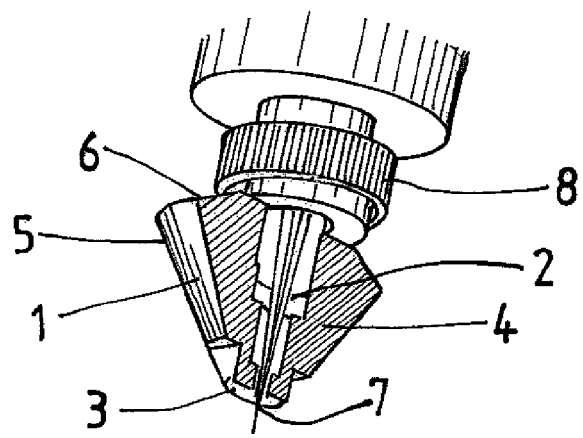
FIG. 1a is an isometric view of the subject nozzle.

As will be better understood in the light of the following explanations given by way of illustration with reference to the appended figures, the present invention relates to a laser nozzle of which the body 1 is of a "semi-axial" design possessing an axial channel 2 for the laser beam and several gas injection passages 3 equidistant from said axial channel 2. The impact points of various gas jets distributed through said gas passages 3 are oriented in the direct vicinity of the zone of interaction with the laser beam.

In other words, the laser nozzle used in the process of the invention is formed from a nozzle body 1 of axis X-X that has an upper surface 6, a lower surface 7 and a peripheral wall 5 with a generally tapered form, extending between said upper 6 and lower 7 surfaces.

Figure 1B:
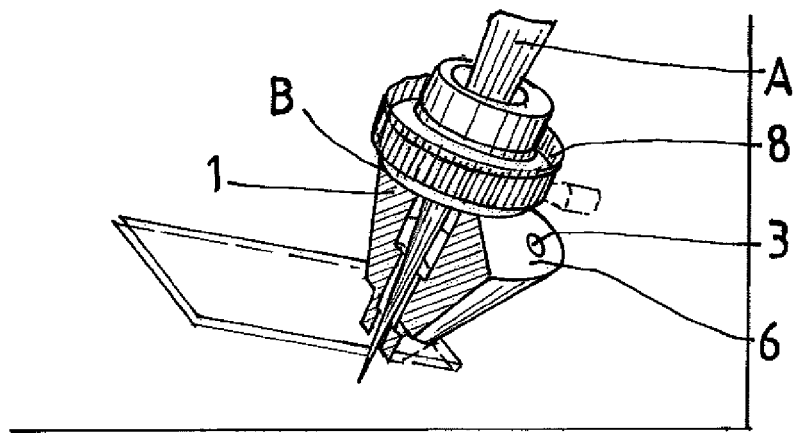
FIG. 1b is another isometric view of the subject nozzle.

As shown in FIGS. 1a and 1b, an axial cut-out 2 extends between the upper 6 and lower 7 surfaces of the nozzle body 1. This cut-out is provided in the peripheral wall 5 of the nozzle body 1, advantageously in a flat part of this wall 5 forming a diametral wall 4. This cut-out 2 forms an open channel to the outside over all its length, that is to say one which is positioned so as to be recessed relative to the flat diametral surface 4 of the peripheral wall 5 of the nozzle body 1 and the interior of which communicates over its entire length with the ambient atmosphere.

The cut-out 2 is dimensioned and adapted so as to be traversed by the laser beam in the direction extending from the upper surface 6 to the lower surface 7.

Several internal passages 3 for conveying gas are drilled through the nozzle body 1 between the upper 6 and lower 7 surfaces.

The internal passages 3 may be oriented toward the X-X axis of the nozzle.

The gas jets delivered through these passages 3 make it possible to control the laser welding process by exerting dynamic pressure on the molten metal pool and the vapor capillary or keyhole.

One embodiment of a nozzle used in the process according to the invention is shown in FIG. 1. This nozzle is "semi-axial", that is to say it has a generally tapered form over only a half circumference and has a flat wall 4 arranged in the region of its diameter, also called a diametral wall 4.

Preferably, the gas injection passages 3 are positioned symmetrically along a half-ring around the axial passage 2. The diameters of the orifices lie between 0.5 mm and 5 mm, preferably 1.5 mm to 2.5 mm. The number of injection passages 3 lies between 1 and 10, preferably between 3 and 5.

The slope of the injection passages 3 lies between 10° and 80° relative to a horizontal plane perpendicular to the X-X axis of the nozzle, preferably between 40° and 50°. The length of the injection passages 3 lies between 5 mm and 200 mm, preferably 30 to 50 mm.

The upper surface 6 of the nozzle body 1 has a fixing device 8 for fixing the nozzle to a support, in particular to a laser machine. The fixing device 8 may for example be a threaded part or ring surmounting the upper surface 6 of the nozzle body 1 capable of being connected, for example screwed, to the end of the optical path or the like that conveys the laser beam from the laser generator to the nozzle.

Figure 2:
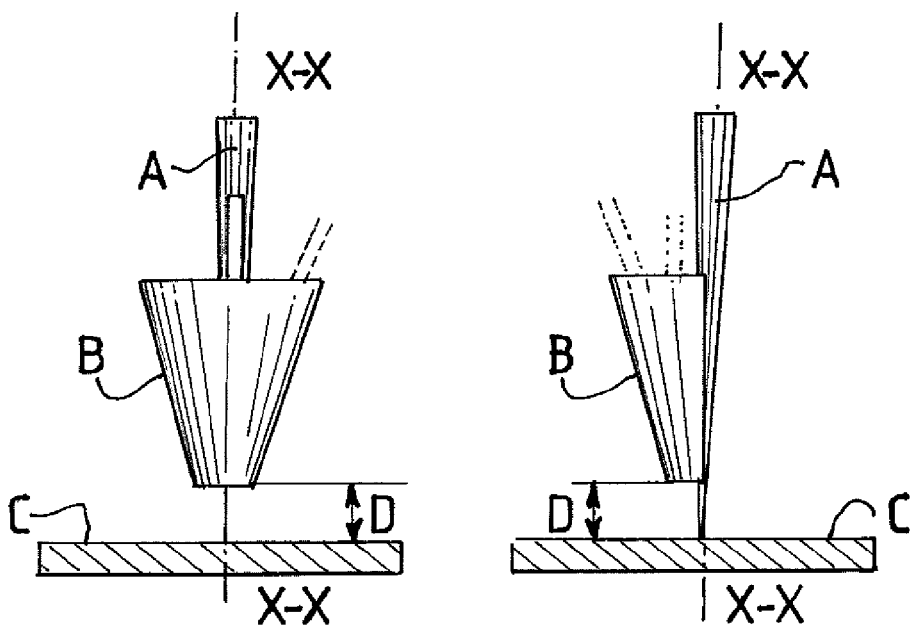
FIG. 2 is a side elevation view of operation of the subject nozzle.

As shown in FIG. 2, the "semi-axial" nozzle B is located in the immediate proximity of the laser beam A, while being positioned above the metal sheet C to be welded, at a height D of 1 mm to 40 mm, preferably 5 mm to 10 mm.

The nozzle B may be centered in relation to a laser beam A in two ways, namely:

use of a predrilled plate with a hole having a diameter less than 1 mm in which the locating laser beam is positioned (generally of the He/Ne type) perfectly aligned on the power laser beam (graph 1a).

use of a rigid tip (generally made of tungsten) that is slid into the gas injection channel. The laser beam is then positioned at the end of the rigid tip.

Generally, the gas passages 3 are distributed symmetrically with respect to the axis of movement of the laser beam A, during a linear welding process.

Figure 3A:
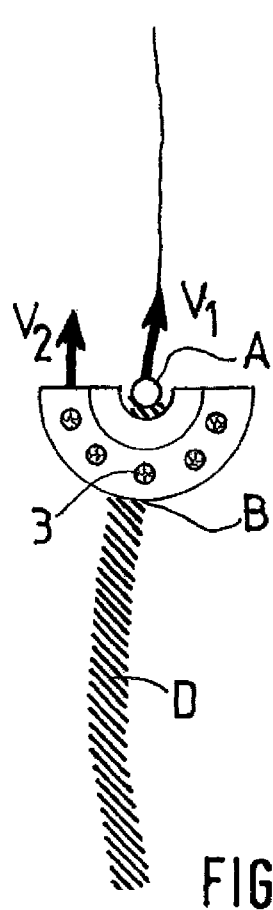
FIG. 3a is a top plan view of operation of the subject nozzle with five internal passages.
Figure 3B:
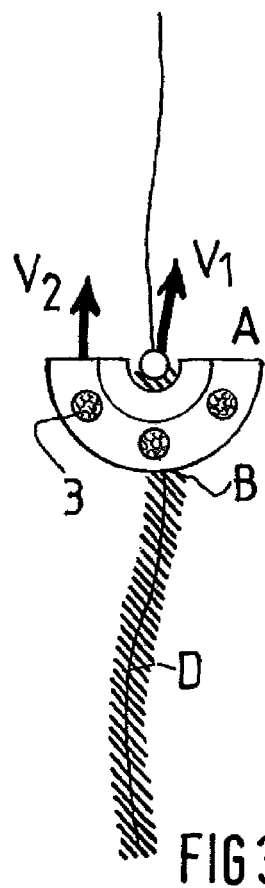
FIG. 3b is another top plan view of operation of the subject nozzle with three internal passages.
Figure 3C:
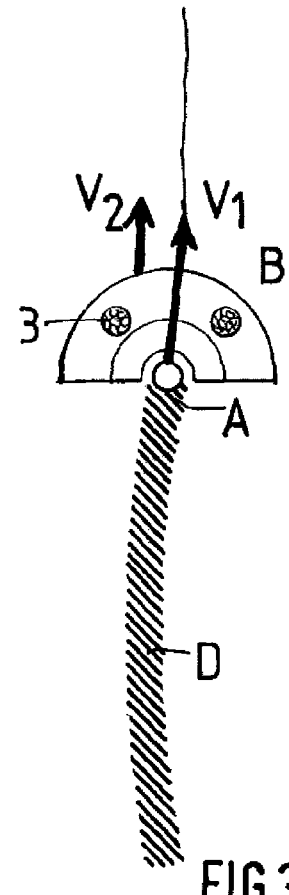
FIG. 3c is another top plan view of operation of the subject nozzle with two internal passages.

Nevertheless, if it turns out that when the laser welding process requires a slight change in direction (nonlinear welding trajectory), it is not necessary to reposition the nozzle B perpendicular to the trajectory. The many injection passages 3 of the semi-axial nozzle B stabilize the welding process in spite of the asymmetry of the movement. This is shown schematically in FIG. 3, which is a view from above of several nozzles B with 5 injection passages 3 (FIG. 3a), 3 injection channels (FIG. 3b) and 2 injection channels (FIG. 3c). The vector V1 corresponds to the velocity of the laser beam A and the vector V2 represents that of the nozzle B. The nozzle B allows changes to be made in the direction of the welding trajectory, that is to say values of angles between the vectors V1 and V2, of around ±1° to ±40°, preferably ±5° to ±20°.

The gas jets issuing from the passages 3 may be directed toward the front face of the capillary, with the nozzle B positioned above the surface of the molten pool (FIGS. 3a and 3b), but the jets may also be oriented toward the rear wall of the capillary, directly on the molten metal pool (FIG. 3c).

All the gases normally used for laser welding may be used with this nozzle B, such as helium, argon, nitrogen, carbon dioxide, oxygen, purified air and all possible mixtures of these gases.

The gas flows injected into each of the orifices may vary independently of each other between 1 l/min and 50 l/min, preferably 10 to 25 l/min.

The axis of a gas jet is generally characterized by the axis of the injection channel 3 of the nozzle B. The intersection of the axes of the jets and of the incident laser beam A is preferably made at the surface of the metal sheet to be welded. Generally, this configuration operates well but it may be varied according to the application and the dynamic effect to be desired on the capillary or the molten metal pool.

Figure 4:
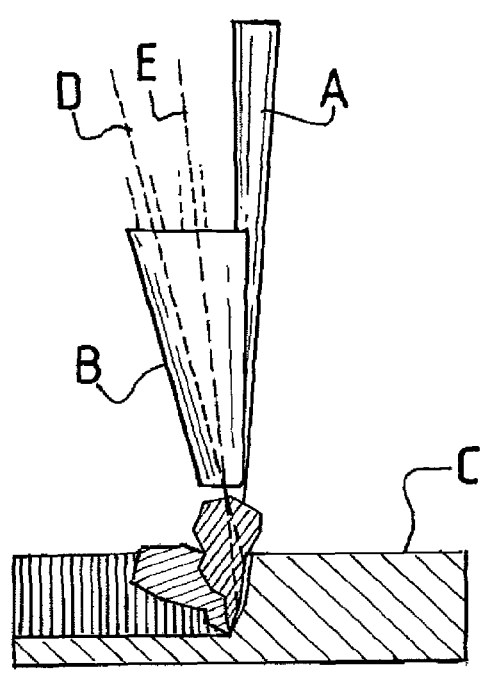
FIG. 4 is a partial cross-sectional side elevation view of operation of the subject nozzle with a particular orientation of the gas passages.

In this way, it is possible to make some of the gas jets from the nozzle meet at the surface of the metal sheet, and other jets at a lower level in the welding capillary, below the surface of the metal sheet. This technique makes it possible, among other things, to improve the penetration of the bead and to improve its quality while permitting better metal vapor evacuation (cf. FIG. 4).

The orientation of the gas passages 3 is chosen according to the desired result.

Figure 5:
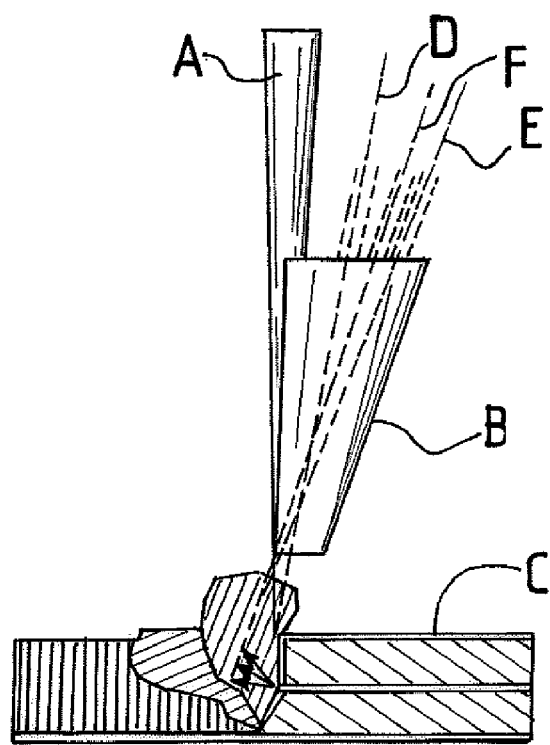
FIG. 5 is a partial cross-sectional side elevation view of operation of the subject nozzle with another particular orientation of the gas passages.

For example, by judiciously choosing their orientations, it is possible to push back the molten metal pool far from the front face of the capillary so as to elongate the mouth of the capillary, longitudinally to the movement. This permits better evacuation of the metal vapor resulting from the laser welding process, outside the capillary. This improves the metallurgical quality of the welds and slightly increases some welding speeds (by ~10%). In this way, novel laser welding configurations become achievable with this type of nozzle, such as the laser welding of coated (zinc or another) metal sheets positioned in a stack with zero play between the metal sheets. In point of fact, elongation of the mouth of the capillary permits better zinc vapors evacuation, initially localized at the interface of the stacked metal sheets (see FIG. 5).

It is also possible to exert a relatively large dynamic force directly. This then produces a modification in convective heat exchange and isotherms in the weld. This permits widening of the bead accompanied by a slight reduction in penetration.

Figure 6:
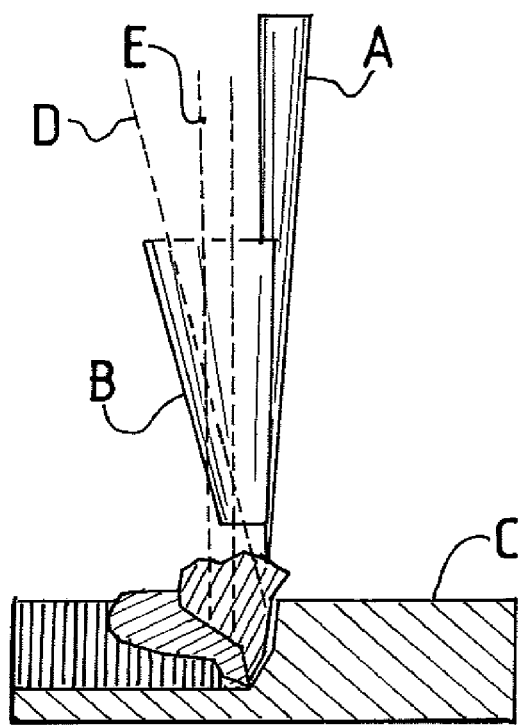
FIG. 6 is a partial cross-sectional side elevation view of operation of the subject nozzle with another particular orientation of the gas passages.

One of the jets may also directly strike the front face of the capillary a few millimeters below the surface of the metal sheet, typically 1 mm to 3 mm depending on the thickness of the metal sheet, while the other gas jets are directed vertically and participate in the penetration of the capillary and the bead (cf. FIG. 6).

The orientation of the passages 3 may be chosen empirically by machining several nozzles having channels of different orientations, and by testing these laser welding nozzles.

The diameter of each internal passage 3 may be the same over the entire length of each passage, or may then vary. For example, the diameter of the inlet orifice of each passage 3 situated on the upper surface 6 may be greater than the outlet diameter situated on the lower surface 7 of the nozzle.

Similarly, the passages 3 or their inlet or outlet orifices may be identical to one another, or may then be different, that is to say for example the passage 3 may have a diameter greater than the diameter or diameters of the other passages 3.

The nozzle body is preferably solid and formed from a metal or metal alloy, preferably an alloy of copper or brass.

As a nonlimiting example, the nozzle may have a height of 2 to 30 cm and a maximum diameter of 1 to 15 cm measured for example at its flat diametral surface 4.

The nozzle used in the process of the invention may be used for welding various configurations, in particular stacks of metal sheets and of various materials, in particular zinc-coated metal sheets. It is therefore particular suitable for use in the field of motor vehicle manufacture.

The process of the invention may be implemented by installing the laser welding nozzle on an automatic welding machine.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for laser welding employing a nozzle for welding by a laser beam, the nozzle formed from a nozzle body comprising:
    an upper surface;
    a lower surface;
    a peripheral wall;
    an axis X-X;
    an axial cut-out extending between the upper and lower surfaces and being provided in the peripheral wall so as to form an external channel recessed relative to a surface of said peripheral wall; and
    a plurality of internal passages drilled through the nozzle body between the upper and lower surfaces, wherein
    the nozzle body has a semi-frustoconical configuration;
    the surface of the peripheral wall from which the external channel is recessed is flat;
    the internal passages are adapted for conveying a gas or a gas mixture; and
    the axial cut-out extends through the nozzle body along the axis X-X so as to allow a laser beam to pass and forms an open channel to the outside over all its length.

2. The process of claim 1, wherein the nozzle has 2 to 10 internal passages.

3. The process of claim 1, wherein the internal passages are drilled equidistant from the axial channel and/or a diameter of the internal passages is between 0.5 mm and 5 mm.

4. The process of claim 1, wherein the internal passages of the nozzle are oriented parallel to the axis X-X.

5. The process of claim 1, wherein the internal passages extend at an angle relative to horizontal of between 10° and 80°.

6. The process of claim 1, wherein a length of the internal passages of the nozzle is between 5 mm and 200 mm.

7. The welding process of claim 1, wherein the gas or gas mixture is selected from the group consisting of helium, argon, nitrogen, carbon dioxide, oxygen, purified air, and mixtures thereof.

8. The welding process of claim 1, wherein a stack of several metal sheets is welded.

9. The process of claim 1, wherein the nozzle has 3 to 5 internal passages.

10. The process of claim 1, wherein the internal passages are drilled equidistant from the axial channel and/or a diameter of the internal passages is between 1.5 mm and 2.5 mm.

11. The process of claim 1, wherein the internal passages extend at an angle relative to horizontal of between 30° and 60°.

12. The process of claim 1, wherein a length of the internal passages of the nozzle is between 20 and 100 mm.

13. The welding process of claim 1, wherein a stack of several zinc-coated metal sheets is welded.

* * * * *